United States Patent [19]
Maehara et al.

[11] Patent Number: 5,852,501
[45] Date of Patent: Dec. 22, 1998

[54] IMAGE READING APPARATUS WHICH DETECTS DOCUMENT ATTRIBUTES

[75] Inventors: Yoshiaki Maehara, Fukuoka; Toshihumi Abe, Kitakyushu, both of Japan

[73] Assignee: Matsushita Electric Industrial Co., Ltd., Osaka, Japan

[21] Appl. No.: 610,855

[22] Filed: Mar. 5, 1996

[30] Foreign Application Priority Data

Mar. 6, 1995 [JP] Japan ................................. 7-045624

[51] Int. Cl.⁶ .............................. H04N 1/46; H04N 1/04; G03G 21/00
[52] U.S. Cl. ......................... 358/505; 358/498; 399/367
[58] Field of Search .................................. 358/296, 298, 358/300, 406, 448, 462, 468, 455, 456, 471, 474, 480, 494, 496, 498, 504, 505, 518, 522; 399/82, 83, 85, 367, 370, 373, 374; 382/312, 319

[56] References Cited

U.S. PATENT DOCUMENTS

| | | |
|---|---|---|
| 4,812,877 | 3/1989 | Nishimari et al. ......................... 399/82 |
| 4,929,979 | 5/1990 | Kimoto et al. ....................... 358/518 X |
| 5,032,904 | 7/1991 | Murai et al. ......................... 358/530 X |
| 5,041,874 | 8/1991 | Nishimari et al. ................... 399/374 X |
| 5,481,354 | 1/1996 | Nakajima ............................. 399/374 X |
| 5,513,017 | 4/1996 | Knedt et al. ............................. 358/471 |

*Primary Examiner*—Eric Frahm
*Attorney, Agent, or Firm*—Spencer & Frank

[57] ABSTRACT

In an image reader with an automatic document feeding (ADF) unit, even when various documents such as color multi-value, color binary, monochrome multi-value, and monochrome binary documents are installed in the ADF unit, the user need not beforehand conduct any setting operations related to the above attributes. The image reading apparatus includes an ADF unit for conveying a document sheet onto a document glass plate a light source for emitting a light beam onto the document, an optical system for receiving reflection light reflected by the document and producing a focused document image, a color image sensor for separating the focused document image into images respectively of a plurality of colors and thereby reading color images, an image read controller having a plurality of read modes, and a carriage for setting an image read position. The image read controller includes a document attribute sensor for detecting a document attribute according to data of the images respectively of plural colors obtained through the document read operation. The document attribute sensor conducts a change-over operation between the plural read modes according to the detected document attribute.

14 Claims, 4 Drawing Sheets

IMAGE READING APPARATUS WHICH DETECTS DOCUMENT ATTRIBUTES

BACKGROUND OF THE INVENTION

1. Field of the Invention

The present invention relates to an image reading apparatus having an automatic document feeding (ADF) unit such as an image scanner and a copying machine.

2. Description of the Related Art

Thanks to increases in the operational speed of workstations, personal computers, and the like these days, it is possible to achieve high-speed operations, for example, to edit color images, to achieve an electric filing system, and to input characters via an optical character reader (OCR). A color scanner of a flat-bed type has been developed which is capable of easily achieving the image input operation. In this situation, to carry out the image input operation at a higher speed and to simplify operation for users, the color scanner includes an ADF unit in many cases.

Figure 5:
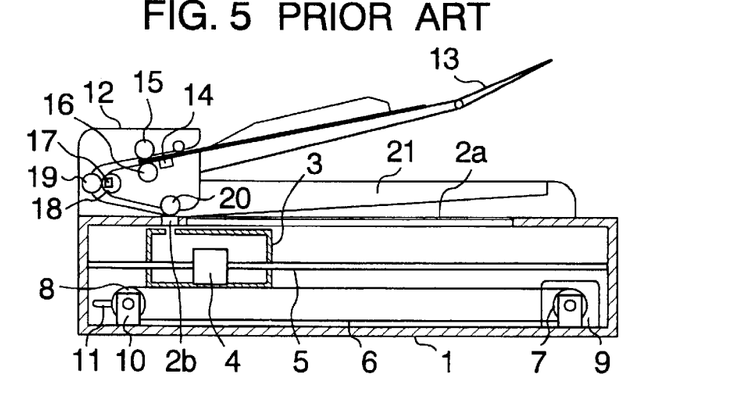
FIG. 5 is a diagram showing the mechanical constitution of a conventional image reading apparatus.

FIG. 5 shows the mechanical structure of a conventional image reader. In FIG. 5, a reference numeral 1 denotes the main body of the image reader and a reference numeral 2a indicates a document glass plate on which the user manually installs a sheet of a document when an (ADF) unit 12, which will be described later, is not used. A numeral 2b designates a window pane provided at a position at which the contents of the document are read when the ADF unit 12 is in use, a numeral 3 is a carriage disposed to carry the document so as to scan and read the contents thereof, and a numeral 4 represents a supporting member mounted on the carriage 3, the member including therein bearings or the like. A numeral 5 indicates a shaft to support the carriage 3 via the supporting member 4, a numeral 6 denotes a driving wire to impart driving force to the carriage 3, and numerals 7 to 9 respectively designate a driving pulley, a pulley to be driven, and a driving motor. A numeral 10 represents a member to support the pulley 8 to be driven, a numeral 11 indicates energizing means, a numeral 12 stands for an ADF unit to continuously transport the document to the reading position, a numeral 13 designates a document tray in which the document is to be installed, a numeral 14 denotes a document sensor to detect presence or absence of the document, a numeral 15 indicates a conveying roller, a numeral 16 represents a reverse roller, a numeral 17 designates a document end sensor to detect a first end position and a last end position of the document, a numeral 18 designates a conveying roller, a numeral 19 is a guide roller disposed to oppose the conveyor roller 18, a numeral 20 indicates a conveying roller to carry the document with the document tightly pressed onto the window pane 2b while keeping constant the distance between a surface of the document and the carriage 3, and a numeral 21 stands for a tray into which the document is ejected after the read operation thereof.

In FIG. 5, the carriage 3 is oriented by the shaft 5 to move only in the direction of subordinate scanning. The carriage 3 is linked with the driving wire 6, which is guided on the driving pulley 7 and driving pulley 8 so as to form a loop. The driving pulley 7 is coupled with the driving motor 9 via a linkage shaft and a decelerating mechanism, which are not shown, to rotate the driving motor 9, thereby driving the carriage 3. The driven pulley 8 is energized by the energizing means 11 via the driven pulley supporter 10 so as to cause tensile force in the driving wire 6. Each sheet of document installed in the tray 13 is transported by the conveying roller 15 and reverse roller 16 to the window pane 2b.

Figure 6:
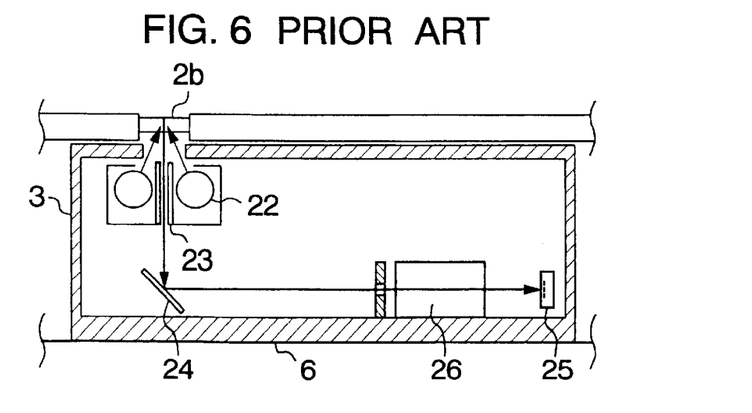
FIG. 6 is a diagram showing the optical system of the conventional image reading apparatus.

FIG. 6 is a configuration diagram showing the optical system of the conventional image reader. This system includes the window pane of glass 2b described above, a lamp 22 as a light source to emit light onto the document, a document reading window 23 disposed in the carriage 3, a reflection mirror 24 to reflect light from the document, a color image sensor 25 to split optical information of a color image into a plurality of colors so as to convert the color image into electric signals, and a focusing lens 26 to obtain a focused image on the image sensor 25.

Next, the operation of the image reader thus constructed will be described.

First, a document is installed on the tray 13 of the ADF unit 12. When the sensor 14 detects the presence of a sheet, the driving motor 9 of the main body 1 starts rotating to transfer driving force via the driving pulley 7, driving wire 6, and driven pulley 8 to the carriage 3. The carriage 3 is moved as a result to a position so that the window 23 is just below the ADF window pane 2b. With the carriage 3 located at the controlled position, the contents of the sheet of document are read while the ADF unit 12 is transporting the document sheet.

In this state, when a document read instruction is issued from an external host computer, not shown, the lamp 22 turns on and an ADF driving motor, which is not shown and is disposed independently of the ADF unit 12, starts turning. Since the driving and guide rollers 18 and 19 are coupled with the ADF driving motor via a decelerating mechanism, the ADF driving motor causes the conveying and guide rollers 18 and 19 to start rotating as follows. When the ADF driving motor reaches a predetermined constant rotary speed, a clutch mechanism, not shown, is set to an operative state to operate the conveying and reverse rollers 15 and 16. As a result, a sheet is transported from the tray 13. Using differences in friction force between the reverse roller 16 and the document paper(s) surface, the reverse controller 16 prevents a plurality of document sheets from being conveyed at the same time. When the sensor 17 detects the first end of the document sheet thus transported, the driving force is removed from the driving and reverse rollers 15 and 16 under control of the clutch mechanism.

As a result, the document sheet is held between the conveying and guide rollers 18 and 19. After this point of time, the sheet is transported by the conveying roller 18. The conveying roller 15 functions as a tension roller to retain an appropriate tension. According to a signal indicating detection of the first end of the document sheet by the sensor 17, there is produced a timing signal to start reading an image on the sheet.

The document sheet thus conveyed receives light illuminated from the lamp 22 via the ADF pane 2b. Light reflected by the sheet is again reflected by the mirror 24 to be focused through the lens onto the image sensor 25. The light is then converted by the sensor 25 into electric signals indicating video information. After it arrives at the window pane 2b, the sheet is then transported by the driving roller 20 into the ejection tray 21.

Subsequently, when the last end of the sheet is detected by the sensor 17 and another sheet is detected by the sensor 14, the conveying and reverse rollers 15 and 16 starts rotating under supervision of the clutch mechanism such that the document sheet is started to be transported from the document tray 13. After the read operation, the document sheet is sequentially accumulated in the tray 21.

Through repeatedly conducting the operation 10 described above, the sheets of a document are sequentially conveyed from the document tray 13 to the ADF window pane 2b for the reading operation thereof. When the sheets in the document tray 13 are thus completely ejected onto the tray 21, the image reading operation for the document is completed.

In general image reading apparatuses, when reading an image represented in the form of binary values corresponding to white and black, the reproducibility of gradation associated with a high signal-to-noise ratio is unnecessary for the image reading apparatus. Consequently, it is possible to minimize the charge loading or accumulating time of the image sensor. In addition, when a color image sensor is employed, the charge accumulating time can be reduced; moreover, when a video signal of a particular color, e.g., green of the resultant video signals corresponding to plural colors obtained by color separation is selectively processed, e.g., through a binarizing operation, the reading speed of the image can be increased as compared with the color document speed. Furthermore, the quantity of video data to be read from one sheet is reduced. In consequence, when starting the document read operation using the conventional image reader, the operator first specifies an operation mode to indicate whether the document is a color or monochrome (white and black) document.

However, in general, when the contents of document are to be read in the form of multi-value data by the conventional image reader, the reproducibility of gradation is required and hence the charge accumulation time of the image sensor becomes greater when compared with the read operation in the form of binary data. Therefore, the image reading time and the quantity of data are considerably increased.

Moreover, in the color reading mode, there is required read data for each of three colors including red (R), green (G), and blue (B). Consequently, the total of the data read in the color reading mode is three times that required in the monochrome reading mode in which read data is required only for one color. When a document which can be represented in the form of binary values corresponding to a monochrome image is read as a color image represented in the form of multiple values, the reading time is increased and the total amount of read data is 24 times (3 (red, green, and blue)×8 bits) that of read data obtained in the binary format. This results in losses in the read time, data transfer, and data storage resource. This is also the case with multi-value monochrome documents although the losses may slightly vary depending on such cases.

To overcome the difficulty, the reading mode is set according to an attribute of the document by the user in consideration of the utilization purpose of the document. Namely, the user beforehand specifies the color multi-value, monochrome multi-value, or monochrome binary read operation.

In consequence, when a document to be consecutively read includes a plurality of sheets which are different in the attribute from the remaining sheets, the user is required to frequently set the document attribute for an appropriate reading operation, leading to the problem of a considerable deterioration in the operation efficiency.

SUMMARY OF THE INVENTION

It is therefore an object of the present invention to provide an image reading apparatus in which the prior mode setting by the user can be dispensed with even when a color multi-value document, a color binary value document, a monochrome multi-value document, a monochrome binary value document, and the like are installed in the ADF unit at the same time.

To achieve the object above, there is provided according to a first aspect of the present invention an image reading apparatus comprising a document feeding unit for conveying a document sheet onto a document glass plate, a light source for emitting a light beam onto the document sheet, an optical system for receiving reflection light reflected by the document sheet and producing a focused document image, a color image sensor for separating the focused document image into images respectively of a plurality of colors and thereby reading color images, an image read control section having a plurality of read modes and a carriage for setting an image read position. The image read control section includes document attribute sense means for detecting a document attribute according to data of the images respectively of plural colors obtained through the document read operation. The document attribute sense means conducts a change-over operation between the plural read modes according to the detected document attribute.

According to a second aspect of the present invention, the document feeding unit can convey the document sheet in a forward direction and in a reverse direction opposite thereto. After conveying a document sheet in the forward direction and starting a reading operation of the document beginning at a first end thereof, the feeding unit can reversely convey the document sheet at an arbitrary point of time to conduct a read operation of the document again beginning at the first end thereof.

According to a third aspect of the present invention, the document attributes include color multi-value, color binary, monochrome multi-value, or monochrome binary attributes.

According to a fourth aspect of the present invention, the document attribute sense means generates a histogram according to data attained by sampling pixels with respect to respective pixel data of a color image having a plurality of colors and then detects level differences for the sampled pixels, thereby deciding that the document has the multi-value or binary attribute.

According to the fifth aspect of the present invention, the document attribute sense means detects an event in the level difference between respective video data of the color image is equal to or more than a predetermined value and detecting according to a signal indicating the event whether or not a continuous period of the signal is equal to or more than a predetermined continuous period and whether or not a range of the signal is beyond a preset range.

According to a sixth aspect of the present invention, the image read control section controls to change according to the read mode a format of video data to be transmitted to an external device and a charge accumulation time of the color image sensor and enables an initial value of the read mode to be set. The control section controls to change, at detection of a document having an attribute other than the document attribute in the read mode, the read mode to match the detected document attribute and reversely transports by the document feeding unit the document sheet to conduct a re-read operation of the document.

According to a seventh aspect of the present invention, the image reading apparatus further includes a buffer memory and a buffer memory control section. The buffer memory temporarily stores therein video data obtained through the document read operation. The image read control section controls to discard, when a read mode set at initiation of the document read operation is different from the read mode corresponding to the document attribute detected by the document attribute sense means, the stored video data and executes a re-read operation of the document. The buffer memory control section allows, when the attributes match each other or when the document is read again, the buffer memory to send the stored video data to an external device.

In the arrangement discussed above, from the video data of a plurality of colors attained by reading the document, there is detected the document attribute indicating, for example, that the document includes a monochrome or color image or the document is in the form of binary data or multi-value data such that a mode switching operation is conducted between the plural read modes according to the detected attribute. In consequence, when the read mode specified when the document read operation is commenced is different from that detected as above, it is possible to take various countermeasures against the above situation by interrupting the document read operation.

Furthermore, after the document sheet is conveyed in the forward direction to start reading the image beginning at the first end of the document, it is possible at an arbitrary point of time to transport the document sheet in the reverse direction to again start reading the image from the first end of the document. In consequence, when the read mode set to the image reader at initiation of the document read operation differs from that detected as above, it is possible to appropriately produce video data of the document. Namely, the document read operation is first stopped, the document conveying roller is reversely turned in the ADF unit to restore the document sheet to the initial position, the read mode is set according to the detected document attribute, and then the document is read in the specified mode.

Additionally, the color multi-value, color binary value, monochrome multi-value, and monochrome binary value attributes are available as the document attributes. This means that documents of any document attributes can be appropriately read by the image reader.

Moreover, for image data of various colors obtained from the color image including a plurality of colors, associated pixels are sampled to resultantly produce a histogram so as to detect level differences for pixels thus sampled. This leads to decision of the document attribute, i.e., "multi-value" or "binary". Therefore, it is possible to determine whether or not the document attribute is appropriate for the read mode beforehand specified.

Furthermore, whether each of the level differences between the image data items of various colors obtained from the color image including a plurality of colors is equal to or more than a fixed value can be detected, and there is obtained a signal indicating that the level difference becomes equal to or more than the fixed value. It is detected whether or not a continuous period of the signal is equal to or more than a predetermined period of time and whether or not a continuous range of the signal is beyond a specified range. Consequently, the document attribute can be decided to be "color" or "monochrome". In consequence, it is possible to determine whether or not the document attribute is suitable for the read mode set in advance.

In addition, the format of image data to be transmitted to an external device and the charge accumulating time of the color image sensor can be changed according to the read mode and hence the signal processing can be accomplished appropriately for the multi-value and binary value data. Moreover, the read mode can be initially set such that even when a document having a document attribute different from the document attribute of the read mode is detected, the document can be correctly read as follows. First, the read mode is set again according to the detected document attribute, the document is reversely transported by the automatic document feeding unit and is then read again.

Furthermore, the image reading apparatus includes a buffer memory and a buffer memory controller. Image data obtained by reading the document is temporarily stored in the buffer memory. When a document attribute detected by the document attribute sensor is different from that specified when the read operation is started, the stored data is discarded and then the document is read again. When the document attributes above match each other or when the image data is attained by the re-read operation, the buffer memory controller allows the buffer memory to send the accumulated image data to an external device. In consequence, it is possible to prevent any erroneous image data obtained by a wrong document read operation from being transmitted to the external device.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENT

An embodiment of the image reading apparatus according to the present invention will now be described.

Figure 2:
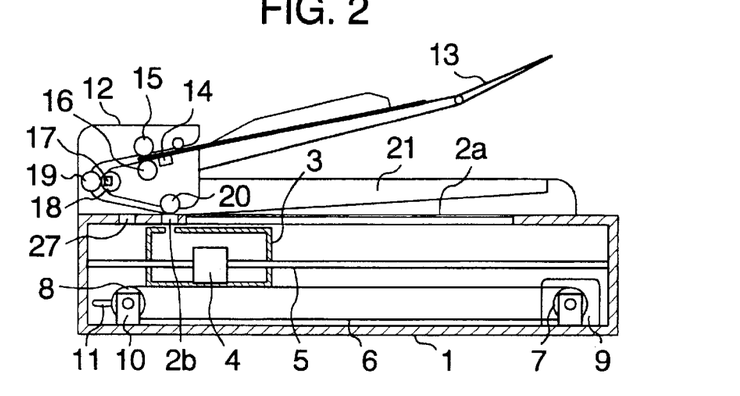
FIG. 2 is a block diagram showing the mechanical configuration of the embodiment of the image reading apparatus according to the present invention.

FIG. 2 shows the mechanical configuration of the embodiment of the image reading apparatus according to the present invention. This apparatus includes a main body 1 of the image reader, a document glass plate 2a, a window pane of glass 2b, a carriage 3, a supporting member 4, a shaft 5, a driving wire 6, a driving pulley 7, a driven pulley 8, a driving motor 9, a driven pulley supporting member 10, an energizing member 11, an automatic document feeding (ADF) unit 12, a document tray 13, a document sensor 14, a conveying roller 15, a reverse roller 16, a document end sensor 17, a conveying roller 18, a guide roller 19, a conveying roller 20, and an ejection tray 21. These constituent elements are the same as those of FIG. 5 and are assigned with the same reference numerals. It is to be appreciated that a description thereof will be accordingly unnecessary. A reference numeral 27 indicates a white calibration plate to adjust the white level for the document.

Figure 1:
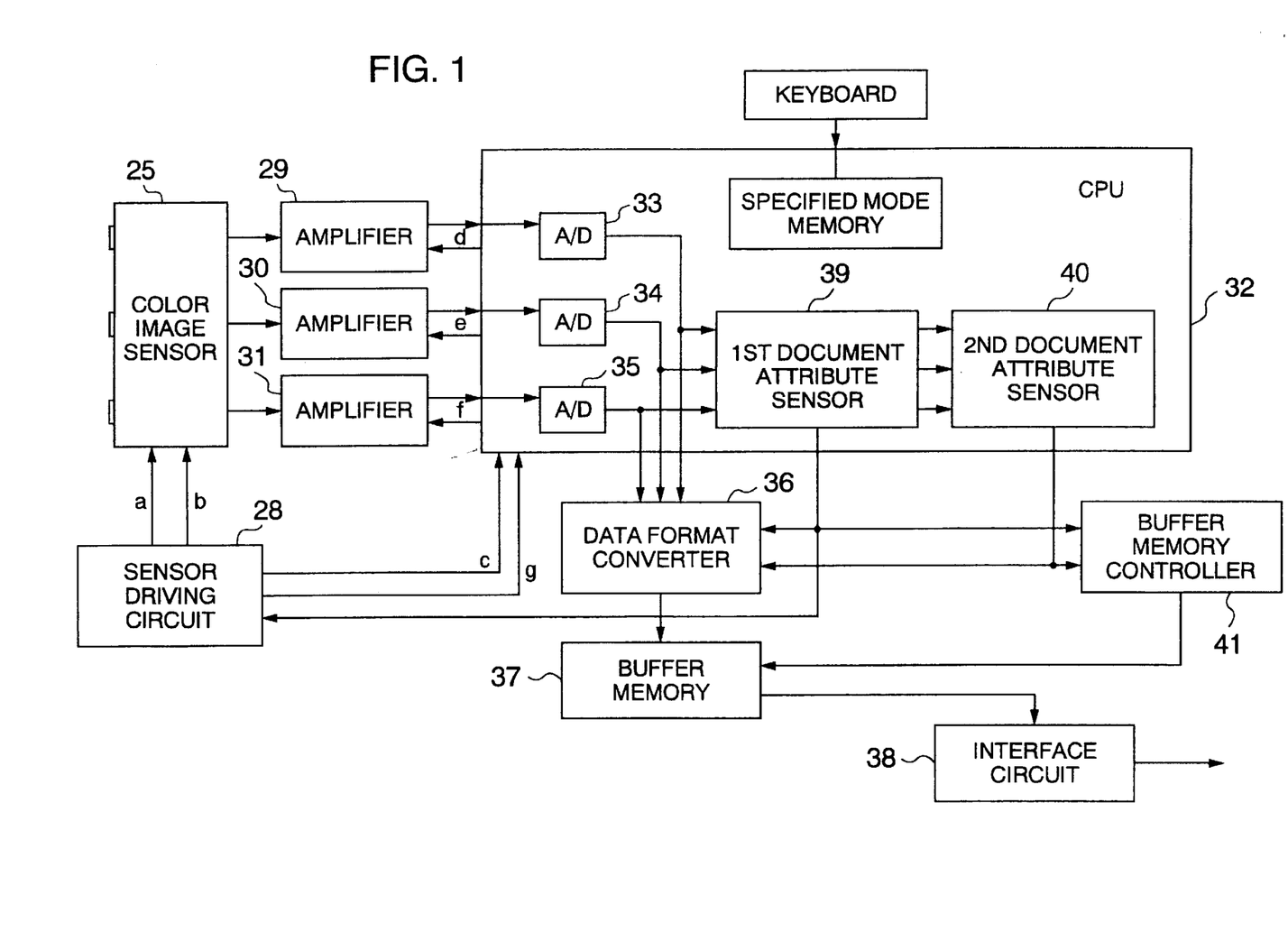
FIG. 1 is a block diagram showing the electric system configuration of an embodiment of the image reading apparatus according to the present invention.

FIG. 1 shows the electric constitution of the embodiment of the image reader according to the present invention. In this configuration, a numeral 25 denotes a color image sensor, which is the same as that of FIG. 6. Consequently, description thereof will be unnecessary. A numeral 28 indicates a sensor driving circuit to supervise the color image sensor 25 and numerals 29 to 31 are amplifiers to adjust by a central processing unit (CPU) 32, which will be described later, signal levels respectively of red (R), green (G), and blue (B) signals from the sensor 25 in an independent fashion for each color. A numeral 32 stands for a CPU as an image reader control section to control the overall system operation and numerals 33 to 35 are analog-to-digital (A/D) converters in the CPU 32 which convert the R, G, and B video signals respectively from the amplifiers 29 to 31 into R, G, and B video data in the digital format. A numeral 36 is a data format converter to convert the video data from the A/D converters 33 to 35 into data in a formal suitable for a higher performance according to a read mode beforehand specified automatically or designated through a keyboard.

A numeral 37 indicates a buffer memory in which video data from the converter 36 is temporarily stored such that the video data is later outputted therefrom via an interface circuit 38 to an external device such as a host computer. The interface circuit 38 supervises data input and output operations from and to the external device. A numeral 39 represents a first document attribute sensor in the CPU 32 to sense a first document attribute (multi-value or binary value attribute), a numeral 40 represents a second document attribute sensor in the CPU 32 to sense a second document attribute(color or monochrome attribute), and a numeral 41 designates a buffer controller to allow or to inhibit the video data read and write operations of the buffer memory 37.

The color image sensor 25 produces a video signal in the line unit each time a line synchronizing signal a is received from the sensor driving circuit 28. Incidentally, a signal corresponding to each pixel of the sensor 25 is created at a timing synchronized with a pixel clock pulse b. The sensor driver 28 produces an image range signal c synchronized with the line synchronizing signal a and indicates a period of time in which the video signal is actually being outputted. The CPU 32 generates gain adjust signals d to f which respectively adjust the gains of the amplifiers 29 to 31. The sensor driver 28 produces a block synchronizing signal g, which is attained by dividing the pixel clock pulse b, e.g., by 64 and which is a timing signal to periodically sample video data.

The operation of the image reader configured as above will be described by referring to FIGS. 1, 2, and 6.

Before the operation of the image reader is initiated or the document read operation is started, the lamp 22 is first turned on such that the image read window 23 (FIG. 6) of the carriage is moved by an instruction from the CPU 32 to a position just beneath the white calibrating plate 27. In the carriage 3, there is configured an optical system including the mirror 24 and 26 in which a beam of light received via the window 23 is reflected and then a light path thereof is bent. Passing the optical system, the light beam is focused onto the color image sensor 25 as an image of one primary scan line of the calibration plate 27 at the pertinent focusing position on the window 23. The sensor 25 is being continuously supplied with the line synchronizing signal a and pixel clock pulse b such that each time the line sync signal a is received, the sensor 25 produces analog video signals of the respective colors R, G, and B in synchronism with the clock pulse b. The analog R, G, and B signals are amplified respectively by the amplifiers 29 to 31 to be then fed to the CPU 32.

On receiving the signals, the CPU 32 detects the maximum value of the video signal levels of signals respectively from the amplifiers 29 to 31 and changes the gain setting values respectively thereof to values indicated by the gain adjust signals d to f, respectively. This equalizes the levels of these video signals and the input level is sufficiently increased for the A/D converters 33 to 35. Therefore, a satisfactory signal-to-noise (S/N) ratio is attained and the white level can be set to an appropriate value for red, green, and blue.

Generally, since the error in the black level attained when the lamp 22 is turned off is less than that developed when the white level is detected, the gain is adjusted for each of the amplifiers 29 to 31 according to the white level in this embodiment. In cases where the gain adjustment requires a higher precision, there may be adopted, for example, the above black-level signals. Namely, according to the signals, there are decided offset values respectively of the amplifiers 29 to 31. The document image can be read after the white level is appropriately decided for each color as above.

Next, the sheets of a document are installed in the document tray 13 of the ADF unit 12. When a document sheet is sensed by the sensor 14, the CPU 32 activates the driving motor 9 of the main body 1. The motor 9 starts tuning and then its driving force is transferred via the driving pulley 7, driving wire 6, and driven pulley 8 to the carriage 3. As a result, the document read window 23 of the carriage 3 is moved under control of the CPU 32 to a position just below the ADF window pane 2b. When the ADF unit 12 is used to read the document in this embodiment, the carriage 3 is located at a position just beneath the ADF window pane 2b so that the document image is read at timings synchronized with transportation of the document by the driving motor in the ADF unit 12.

In this state, when a document read instruction is issued from, e.g., an external device or a keyboard, the CPU 32 turns the lamp 22 on and initiates operation of the driving motor arranged independently of the ADF unit 12 and then starts the document read operation after the read mode is specified. For the available document read modes, reference is made to Table 1.

TABLE 1

| Read mode | Charge accumulation time of sensor | Data format |
|---|---|---|
| Color multi-value image | 10 mS |  |

TABLE 1-continued

| Read mode | Charge accumulation time of sensor | Data format |
|---|---|---|
| color binary value image | 5 mS | Byte: \| R1 \| G1 \| B1 \| R2 \| G2 \| B2 \| R3 \| G3 \| B3 \| R4 \| G4 \| B4 \|<br>Pixel \| Pixel \| Pixel \| 2 2/3 pixel/byte |
| Monochrome multi-value image | 10 mS | Byte\|Byte\|Byte\|Byte<br>G1 \| G2 \| G3 \| G4<br>Pixel\|Pixel\|Pixel\|Pixel<br>1 pixel/byte |
| Monochrome binary value image | 5 mS | Byte \| Byte<br>G1\|G2\|G3\|G4\|G5\|G6\|G7\|G8\|G9\|G10\|G11\|G12<br>Pixel ... 8 pixelS/byte |

As can be seen from Table 1, four kinds of document read modes are available, namely, color multi-value read, color binary read, monochrome multi-value read, and monochrome binary read modes. In this case, the monochrome binary read mode in which the document can be read at the highest read speed is chosen as the initial read mode. It is to be appreciated that any other read mode may be set to the initial mode. Moreover, the previous read mode of the detected document attribute may be continuously employed for the subsequent read operation.

Since gradation reproducibility associated with a high signal-to-noise ratio is unnecessary in the reading of a color or monochrome binary image, the charge accumulation time is set to a small value of 5 milliseconds (ms), which is half that of the multi-value read operation (10 ms). Moreover, in the monochrome read mode, when an image of a particular color is focused on the sensor 25, e.g., an image of green, and is selectively subjected to a binarizing process, the document image can be read at a higher speed with a reduced amount of data as compared with the read operation in the color read mode. Additionally, the quantity of video data (8 pixels/byte) of one document sheet in the monochrome binary mode is only 1/24 that of one document sheet in the color multi-value mode.

Since the charge accumulation time of the sensor 25 in the binary read mode is set to 5 ms, which is about half that (10 ms) in the multi-value read mode, the rotary speed of the driver motor at the initiating point is set to a value corresponding to the image read speed, which is about twice that of the color document read operation. As was mentioned earlier, the conveying roller 18 is linked via a decelerating mechanism, not shown, with a driving motor independently provided in the ADF unit 12, and hence starts rotating when the driving motor is activated. When the driving motor above reaches a fixed rotary speed, the CPU 32 controls a clutch mechanism, not shown, to turn the conveying and reverse rollers 15 and 16 to start transporting a sheet of the document installed in the tray 13. Using differences in friction force between the roller and the document paper(s) surface, the reverse roller 16 prevents two or more sheets of the document from being transported at the same time.

When the sensor 17 senses the first end of the conveyed document sheet, the CPU instructs the clutch mechanism to remove the driving force from the conveying and reverse rollers 15 and 16. The document sheet is held between the conveying and guide rollers 18 and 19 at this point such that the sheet is thereafter transported by the conveying roller 18. The roller 15 functions as a tension roller. Moreover, when the first end is detected as above, a timing point of the document read start signal is set with a delay of time corresponding the distance between the position of the sensor 17 and the position of the read window 23 of the carriage 3 just below the ADF window pane 2b.

When the read start signal is sensed, the CPU 32 invokes the buffer memory controller 41 to enable a video data write operation in the buffer memory 37 and then initiates reading of the image of the document sheet being conveyed.

When the first end of the sheet reaches the window pane 2b, the light beam emitted from the lamp 22 is radiated onto the document and then light reflected by the document enters the optical system of the carriage 3 through the read window 23. In the carriage 3, there is formed an optical system including the mirror 24 and lens 26 to reflect the light beam received from the read window and to bend the light path thereof. Passing the optical system, the light beam forms on the sensor 25 an image of one primary scan line of the document at the pertinent focusing position of the read window 23.

The line synchronizing signal a and pixel clock pulse b are continuously fed from the sensor driving circuit 28 to the sensor 25 as described above. Each time the sync signal a is received, the sensor 25 produces analog video signals of red, green, and blue in synchronism with the clock pulse b. The analog video signals are amplified respectively by the amplifiers 29 to 31 to appropriate levels and then are delivered to the CPU 32 (image read control section).

The CPU 32 includes three A/D converters 33 to 35, which converts the analog video signals of red, green, and blue into video data of the respective colors. Moreover, the resultant signals are transformed by the data format converter 36 into data in a formal specified by the read mode shown in Table 1.

On receiving the image read start signal in this situation, the CPU 32 activates the controller 41 to allow the buffer memory 37 to write data therein such that the video data thus read is sequentially accumulated in the memory 37 in a line-by-line fashion according to the format designated by the read mode.

In this embodiment, the line sync signal a and pixel clock pulse b from the sensor driver 28 respectively have periods of 10 ms and about 4.8 microseconds. Since the number of pixels of the sensor 25 is, e.g., 1654 (A4 size (JIS), 200 dots per inch (dpi)), the video data of one line outputted at timings synchronized with the clock pulse b can be completely written in the memory 37 in about eight milliseconds.

On the other hand, the document transport speed is set to 50 mm/s. Since the line sync signal a is produced at an interval of 10 ms, the document is conveyed 0.5 mm in the secondary scan direction during a period in which the sensor 25 reads one line of video data.

As above, each line of the document image is sequentially read while the document is being transported and then the image attained is written in the buffer memory 37. During the operation, the CPU 32 conducts an operation to sense the document attribute, which will be described later, to decide whether or not the read mode associated with the result of the sense operation matches that set in advance. If mismatching occurs as a result of this operation, the CPU 32 stops the document read operation and thereafter executes a re-read operation of the document.

Figure 3:
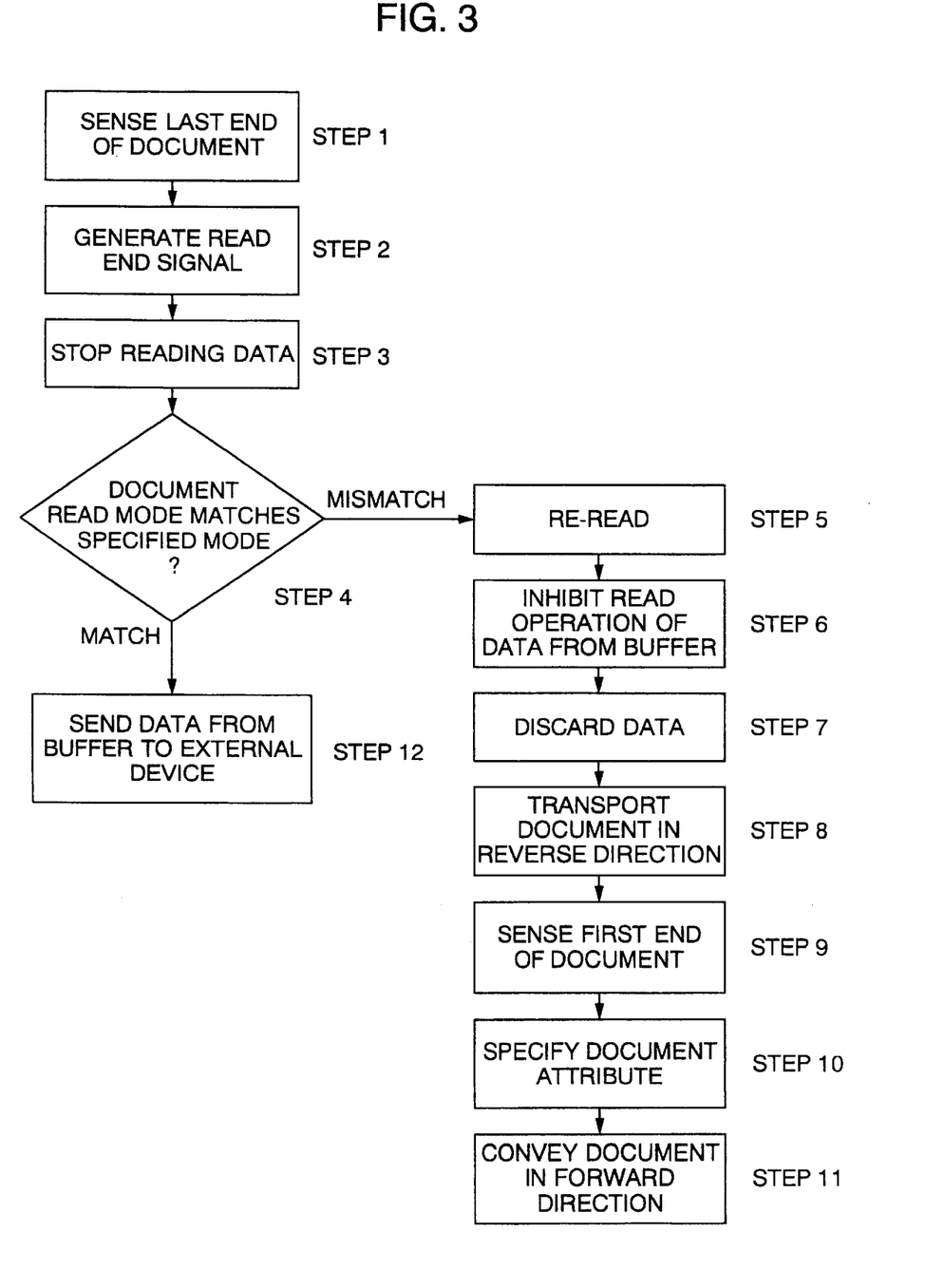
FIG. 3 is a flowchart showing a mode change operation of the embodiment of the image reading apparatus according to the present invention.

Referring now to FIG. 3, a process of changing the read mode according to the present invention will be described. FIG. 3 is a flowchart of the mode change procedure in the image reader of the present invention.

In FIG. 3, when the last end of the document is detected by the sensor 17 (step 1), the CPU 32 produces a read end signal at a timing with a delay of a period of time associated with the distance from the sensor 17 to the position of the window 23 below the ADF window pane 2b (step 2). Using the read end signal, the CPU 32 instructs the buffer memory controller 41 to inhibit the writing of video data in the memory 37 (step 3).

Subsequently, the CPU 32 determines whether or not the document image attribute obtained matches the attribute mode specified in the image reading apparatus in advance (step 4). Depending on the results from step 4, the CPU 32 passes control to steps of transmitting the document data to an external device such as a host computer or steps of conducting a re-reading of the document.

If matching results from step 4, the CPU 32 activates the controller 41 to enable the reading of video data of document from the memory 37 so as to start transmitting the data via the interface circuit 38 to the external device such as a host computer (step 12).

If mismatching results, the CPU 32 issues an instruction to conduct a document read operation in the specified read mode (to be called a re-read operation herebelow; step 5).

The controller 41 then inhibits the reading of data from the memory 37 (step 6) and discards the video data of one document sheet thus read by the image reader (step 7). In the buffer memory 37, data is handled on a first-in-first-out (FIFO) manner in which the pertinent write address of data is increased when data is written therein and is decreased when data is read therefrom. Consequently, when video data of one document sheet is written, the address is increased according to the quantity of data unless data is read therefrom. In consequence, to discard data, it is only necessary to decrease the pertinent address of the buffer memory 37 according to the amount of video data of one document sheet.

To achieve the re-reading of the document sheet, the CPU 32 causes the driving motor to turn in the reverse direction, the motor being independently provided in the ADF unit 12. The conveying roller 18, guide roller 19, and conveying roller 20 are coupled with the ADF driving motor. Therefore, when the motor starts rotating in the reverse direction, the document sheet is transported by the rollers 20, 28, and 19 in this order in a direction opposite to the direction in which the document is conveyed in the read operation (step 8). When the sensor 17 detects the first end of the document sheet (the upper end thereof in the usual case) thus reversely transported, the CPU 32 stops the driving motor (step 9) and then executes the re-reading of the document sheet already read once.

In this operation, according to the detected document attribute, the CPU 32 specifies the read mode to the sensor driver 28 and data format converter 36 (step 10). The CPU 32 then activates the ADF driving motor in the forward direction to start conveying the document sheet (step 11). The operations of the ADF unit 12 after this point are the same as those described above and hence description thereof will be unnecessary.

On receiving an image read start signal, the CPU 32 allows the data read operation of the buffer memory at the same time when the write operation of video data in the memory 37 is started so that the video data of the document (stored as correct data) is concurrently sent therefrom via the interface circuit 38 to an external device.

In the above operation, the CPU 32 monitors the write and read addresses to prevent an overrun event, in which the read address is smaller than the write address or the write address exceeds the memory address limitation. Video data of one document sheet is thus completely processed by the image reader. The document sheet is ejected onto the ejection tray 21.

On other hand, when the sensor 17 detects the last end of document and the document sensor 14 detects another document sheet, the CPU 32 supervises again the clutch mechanism to activate the conveying and reverse rollers 15 and 16 so as to start transporting the document sheet from the tray 13. In this case, the read mode can be selected, namely, the mode is returned again to the default mode (initially set with the highest priority) or the read mode corresponding to the attribute of the previous document is kept retained.

The operation above is repeatedly carried out for all sheets of the document in the tray 13. Until the sensor 14 detects that all document sheets have been completely transported from the tray 13, the document attribute is checked for each document sheet. Consequently, the read mode is appropriately set according to the document attribute in the read operation and the obtained video data is transmitted to an external device. The image reader is connected to external devices such as a host computer and a printer such that the attained video data is transferred via the interface circuit 38 to the host computer. Conversely, the image reader can receive directly from the host computer such information as an indication of the operation mode, read conditions including the resolution and read range, and th3 attribute of document.

Figure 4:
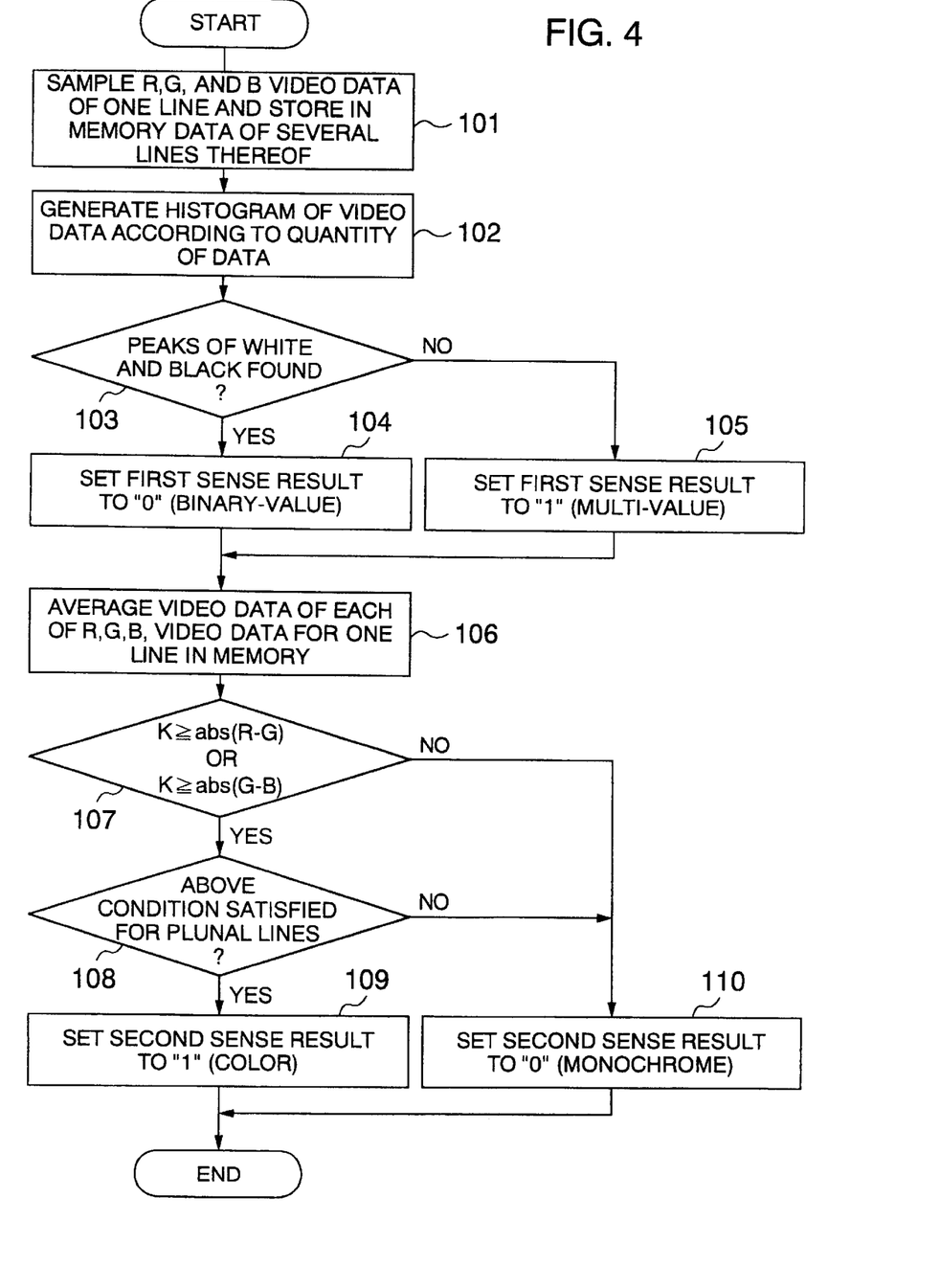
FIG. 4 is a flowchart for explaining operation of the image reading apparatus according to the present invention.

Referring next to Table 2 and the flowchart of FIG. 4, the operations of the sense means 39 and 40 in the embodiment will now be described in detail.

TABLE 2

| Sense output from 1st sense means Multi-value/ binary value | Sense output from 2nd sense means Color/ monochrome | Document attribute sense result |
| --- | --- | --- |
| 1 | 1 | Color multi-value document |
| 0 | 1 | Color binary value document |
| 1 | 0 | Monochrome multi-value document |
| 0 | 0 | Monochrome binary value document |

As can be seen from Table 2, the video data of a document is classified by the means 39 and 40 into data of a colored multi-value document, a colored binary document, a monochrome multi-value document, or a monochrome binary document. While the image range signal c is being produced, the CPU 32 samples the video data of red, green, and blue in synchronism with the block sync signal g, thereby determining the document attribute. The operation will now be described by referring to the flowchart of FIG. 4.

The document attribute is judged through two main processes, i.e., first and second processes. In the first process, the values of red, green, and blue video data attained by the sensor 25 are measured in the unit of one pixel or multiple pixels to generate a histogram representing the frequency of values so as to determine whether the reader handles a multi-value or binary image. In the second process, the video signals from the sensor are periodically sampled and processed to attain a mean value for each of red, green, and blue, and then a level difference with respect to the mean value is obtained for each of red, green, and blue to thereby decide whether the reader processes a color or monochrome image.

The first process is accomplished by the first document attribute sensor 39 to detect the first document attribute (binary or multi-value attribute), whereas the process is accomplished by the second document attribute sensor 40 to sense the second document attribute (color or monochrome attribute).

The first process will now be described. When a read start signal due to the sensor 17 is detected, the CPU 32 monitors the image range signal c. If the signal c is being outputted, the CPU 32 enables interruption by the block sync signal g. Each time a block sync signal g is received thereafter, the CPU 32 samples one line of video data in the order of red, green, and blue such that the sampled video data is accumulated in the buffer memory 37, the data occupying several lines of the memory 37 (step 101). Since the block sync signal g is attained by dividing the pixel clock pulse b by 64, the CPU 64 is interrupted each time 64 pixels are transferred. For each interruption, the reading of video data of red, green, and blue is conducted for one pixel or a plurality of pixels. In the first process, only signals of green are utilized because green has the highest correlation with luminance information, and most appropriately reflects information on resolution.

Subsequently, each time the video data read operation is conducted for red, green and blue, the CPU 32 computes the value of video data of green to incrementally increase the value of a memory area, not shown, decided according to the value. For example, when the data value is 0, the increasing operation is executed for a memory area at an address of (first address+0), and when the value is 80 in hexadecimal notation, the operation is effected for a memory area at an address of (first address +80H; step 102). As a result of the above operation, a histogram is produced according to data attained from sensor 25.

Next, the histogram is checked during the document read operation by deciding whether or not the values of video data thus attained have two peaks respectively for white and black, namely, a peak in the smaller value (white) and a peak in the larger values (black; step 103). If two peaks respectively of white and black portions are present, the result of the first document attribute sense operation by the first means 39 is regarded as "0", namely a "binary document" (step 104). If there exists no or only one peak or if an intermediate level between two peaks exceeds a predetermined value, the result of the first sense operation by the means 39 is assumed to be "1", namely, a "multi-value document" (Table 2; step 104). As described above, whether a sheet has a binary or a multi-value document attribute is decided in the first process.

Moreover, when one document includes binary and multi-value images, it is considered that an intermediate level is also detected together with two peaks of video data values for the smaller values (white) and larger values (black). In this situation, a threshold value is specified for the intermediate level. If the intermediate value is equal to or more than the threshold value, the multi-value image attribute takes precedence for the document. Similarly, if the level is less than the threshold value, the binary image attribute is assumed for the document.

Next, the second process will be described. The data of the first process is utilized also in the second process.

First, one line of video data of the respective colors obtained for each block sync g is separated into components corresponding to red, green, and blue to be stored in memory areas respectively allocated thereto. Since the sensor 25 includes 1654 pixels and the block sync signal g rises at an interval of 64 pixels, 26 words (=1654/64) are used for one line per color. For the three colors red, green, and blue, there is accordingly required a memory area of 26 words×3. In this embodiment, data of a plurality of pixels is attained by one sampling operation to accumulate the values of plural pixels and then a mean value thereof is calculated for each color to be stored in the memory area (step 106).

Subsequently, the mean values of the respective colors are compared with each other with respect to pixels obtained at the same timing to thereby detect the level differences therebetween. Using a predetermined threshold value K, it is decided whether or not K≧abs (R−G) (where abs (R−G) indicates the absolute value of (R−G)) or K≧abs (G−B) holds. To avoid any error detection, a check is conducted to determine whether or not the above condition is satisfied for a plurality of words in the 26 words for each color (step 107). Moreover, for the same purpose, the check of step 107 is carried out also for the next line of video data (step 108).

If the above condition holds for a plurality of consecutive lines, the result of the second sensing operation of the second means 40 is regarded as "1", i.e., a "color document" (Table 2; step 109).

If the condition is not satisfied, the sensing result from the second means 40 is assumed to be "0", namely, a "monochrome document" (Table 2; step 110).

As indicated above, in the second process, the document image is subdivided into blocks to decide the document attribute according to mean values of the respective blocks.

Additionally, a document including monochrome and color images is considered to have the color document attribute.

According to the embodiment described above, the first and second document attributes are determined respectively by the first and second processes. In short, the multi-value or binary document attribute is decided by the first process and the color or monochrome document attribute is determined by the second process. Consequently, the document attributes can be determined to be color multi-value, color binary, monochrome multi-value, or monochrome binary by the first and second document attribute sensors 39 and 40.

As described above, the image reading apparatus according to the present invention includes document attribute sense means to detect the document attributes according to video data of a plurality of colors attained by reading the document image by the image read control section such that a change-over operation can be achieved between a plurality of read modes depending on the document attributes detected by the sense means. Consequently, when the detected document attributes do not match the read mode set in advance, it is possible to interrupt the document read operation so as to thereby prevent any image read errors through various countermeasures. It is therefore possible to achieve an image reading apparatus capable of appropriately reading the contents of the document installed in the ADF unit even when the document includes color multi-value, color binary, monochrome multi-value, and monochrome binary document sheets. This makes it unnecessary for the user to specify the read mode prior to initiation of the read operation.

Additionally, after conveying the document sheet in the forward direction to read the beginning at the first end thereof, the image reader can reversely transport the sheet at any point of time to initiate a re-reading of the contents thereof. In consequence, when the sensed document attribute is other than the read mode beforehand designated, the document read operation can be stopped to achieve an appropriate read operation as follows. Namely, the ADF unit is operated in the reverse direction to restore the document to the initial read position. The document attribute of the read mode is specified again according to the sensed document attribute and then the document read operation is initiated to thereby obtain video data matching the document attribute. Consequently, there can be implemented an image reading apparatus capable of appropriately reading the contents of the documents even when the documents include color multi-value, monochrome multi-value, and monochrome binary documents. This makes it unnecessary for the user to specify the read mode prior to initiation of the read operation.

Furthermore, the available document attributes include color multi-value, color binary, monochrome multi-value, and monochrome binary attributes and hence any document attributes can be processed by the image reader. In consequence, an image reading apparatus capable of appropriately reading the contents of the document can be realized even when the documents include color binary, monochrome multi-value, and monochrome binary documents.

In addition, a sampling operation is conducted for pixels with respect to each color video data of a color image including a plurality of colors such that a histogram is generated with data obtained by the sampling operation so as to detect level differences related to the pixels, in order to determine whether the document has the multi-value or binary attribute. Therefore, it is possible to decide whether or not the document attribute matches that of the specified read mode. As a result, there is a provided an image reading apparatus capable of appropriately reading the contents of the document even when the documents include multi-value and binary documents.

Moreover, the image reader detects whether the level difference between the respective color video data of a color image including a plurality of colors is equal to or more than a predetermined value. Accordingly, whether or not the continuous period of the signal is equal to or more than a predetermined continuous period and whether or not the range of the signal is beyond a preset range can be detected. This makes it possible to determine whether the document has the color or monochrome attribute. Moreover, whether or not the document attribute matches that of the specified read mode can also be examined. As a result, there is provided an image reading apparatus capable of appropriately reading the contents of the documents at a high speed on average even when the documents include color and monochrome documents.

Additionally, the format of video data transmitted to an external device and the charge accumulation time of the color image sensor can be changed according to the read mode, and it is allowed to set the initial value of the read mode. When there is detected a document having an attribute different from the document attribute in the read node, the read mode is changed according to the detected document attribute and the document sheet is reversely conveyed by the automatic document feeding unit to carry out a re-read operation thereof. Therefore, the signal processing can be accomplished appropriately for multi-value and binary documents, and the contents thereof can be read without any error. In consequence, there can be implemented an image reading apparatus capable of achieving an optimal document read operation and appropriately reading the contents of the documents even when the documents include color binary, monochrome multi-value, and monochrome binary documents.

Furthermore, there are provided a buffer memory and a buffer memory control section. In the memory is temporarily stored video data obtained through the document read operation. When the read mode set beforehand at initiation of the document read operation is different from that detected by the document attribute sense means, the image read controller discards the video data temporarily stored in the memory and conducts a re-read operation of the document. When the document attributes above match each other or when the re-read operation is executed, the buffer memory control section allows the buffer memory to send the stored video data to an external device. In consequence, the document image can be correctly read and it is possible to prevent an event in which wrong video data attained by an erroneous document read operation is transmitted to an external device. Consequently, there can be achieved an image reading apparatus capable of appropriately reading the contents of the documents even when the documents include color binary, monochrome multi-value, and monochrome binary documents and transmitting correct video data to an external device.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

We claim:

1. An image reading apparatus for conducting a document read operation by moving a two-dimensional document sheet having a main-scan direction and a sub-scan direction in the sub-scan direction while sequentially reading lines of the document sheet in the main-scan direction, comprising:

a document feeding unit for conveying the document sheet onto a document glass plate;

a light source for emitting a light beam onto the document sheet;

an optical system for receiving light reflected by the document sheet and producing a focused document image;

a color image sensor for separating the focused document image into images respectively of a plurality of colors and producing data of the respective color images;

an image read control section having a plurality of read modes; and a carriage for setting an image read position, wherein the image read control section includes document attribute sense means for detecting a first attribute indicating whether the document image is monochrome or colored and for additionally detecting a second attribute indicating whether the document image is binary or multi-value, and wherein the document attribute sense means conducts a change-over operation between the plural read modes according to the first and second attributes detected by the document attribute sense means.

2. An image reading apparatus according to claim 1, wherein the document feeding unit can convey the document sheet in a forward direction and in a reverse direction opposite thereto, the forward and reverse directions being parallel to the sub-scanning direction, and wherein the document feeding unit, after conveying the document sheet in the forward direction and starting a read operation of the document sheet beginning at a first end thereof, reversely conveys the document sheet at an arbitrary point of time if a predetermined event occurs and a read operation of the document sheet is conducted again beginning at the first end thereof.

3. An image reading apparatus for conducting a document read operation by moving a two-dimensional document sheet having a main-scan direction and a sub-scan direction in the sub-scan direction while sequentially reading lines of the document sheet in the main-scan direction, comprising:

a document feeding unit for conveying the document sheet onto a document glass plate;

a light source for emitting a light beam onto the document sheet;

an optical system for receiving light reflected by the document sheet and producing a focused document image;

a color image sensor for separating the focused document image into images respectively of a plurality of colors and producing data of the respective color images;

an image read control section having a plurality of read modes; and a carriage for setting an image read position, wherein the image read control section includes document attribute sense means for detecting document attributes according to the data of the respective color images, the document attributes including color multi-value, color binary, monochrome multi-value, or monochrome binary attributes, wherein the document attribute sense means conducts a change-over operation between the plural read modes according to the detected document attributes, and wherein the document attribute sense means generates a histogram according to data attained by sampling pixels with respect to pixel data of at least one of the color images and then detects level differences for the sampled pixels, thereby deciding whether the document has the multi-value or binary attribute.

4. An image reading apparatus according claim 3, wherein the document feeding unit can convey the document sheet in a forward direction and in a reverse direction opposite thereto, the forward and reverse directions being parallel to the sub-scanning direction, and wherein the document feeding unit, after conveying the document sheet in the forward direction and starting a read operation of the document sheet beginning at a first end thereof, reversely conveys the document sheet at an arbitrary point of time if a predetermined event occurs and a read operation of the document sheet is conducted again beginning at the first end thereof.

5. An image reading apparatus for conducting a document read operation by moving a two-dimensional document sheet having a main-scan direction and a sub-scan direction in the sub-scan direction while sequentially reading lines of the document sheet in the main-scan direction, comprising:

a document feeding unit for conveying the document sheet onto a document glass plate;

a light source for emitting a light beam onto the document sheet;

an optical system for receiving light reflected by the document sheet and producing a focused document image;

a color image sensor for separating the focused document image into images respectively of a plurality of colors and producing data of the respective color images;

an image read control section having a plurality of read modes; and a carriage for setting an image read position, wherein the image read control section includes document attribute sense means for detecting document attributes according to the data of the respective color images, the document attributes including color multi-value, color binary, monochrome multi-value, or monochrome binary attributes, wherein the document attribute sense means conducts a change-over operation between the plural read modes according to the detected document attributes, and wherein the document attribute sense means detects a state in which the level difference between respective data of a pair of the color images is equal to or more than a predetermined value and detects according to a signal indicating the state whether or not a continuous period of the signal is equal to or more than a predetermined continuous period and whether or not a range of the signal is beyond a preset range.

6. An image reading apparatus according to claim 5, wherein the document feeding unit can convey the document sheet in a forward direction and in a reverse direction opposite thereto, the forward and reverse directions being parallel to the sub-scanning direction, and wherein the document feeding unit, after conveying the document sheet in the forward direction and starting a read operation of the document sheet beginning at a first end thereof, reversely conveys the document sheet at an arbitrary point of time if a predetermined event occurs and a read operation of the document sheet is conducted again beginning at the first end thereof.

7. An image reading apparatus for conducting a document read operation by moving a two-dimensional document sheet having a main-scan direction and a sub-scan direction in the sub-scan direction while sequentially reading lines of the document sheet in the main-scan direction, comprising:

a document feeding unit for conveying the document sheet onto a document glass plate;

a light source for emitting a light beam onto the document sheet;

an optical system for receiving light reflected by the document sheet and producing a focused document image;

a color image sensor for separating the focused document image into images respectively of a plurality of colors and producing data of the respective color images;

an image read control section having a plurality of read modes; and a carriage for setting an image read position, wherein the image read control section includes document attribute sense means for detecting a document attribute according to the data of the respective color images, wherein the document attribute sense means conducts a change-over operation between the plural read modes according to the detected document attribute, and wherein the image read control section changes, according to the read mode, a format of video data to be transmitted to an external device and a charge accumulation time of the color image sensor, and enables an initial value of the read mode to be set, and wherein the control section changes, upon detection that the document sheet has an attribute other than the document attribute in the read mode, the read mode to match the detected document attribute and reversely transports by the document feeding unit the document sheet and conducts a re-read operation of the document sheet.

8. An image reading apparatus according to claim 7, wherein the document attribute sense means further comprises means for sensing at least one additional document attribute, and wherein the document attribute and at least one additional document attribute include color multi-value, color binary, monochrome multi-value, or monochrome binary attributes.

9. An image reading apparatus for conducting a document read operation by moving a two-dimensional document sheet having a main-scan direction and a sub-scan direction in the sub-scan direction while sequentially reading lines of the document sheet in the main-scan direction, comprising:

a document feeding unit for conveying the document sheet onto a document glass plate;

a light source for emitting a light beam onto the document sheet;

an optical system for receiving light reflected by the document sheet and producing a focused document image;

a color image sensor for separating the focused document image into images respectively of a plurality of colors and producing data of the respective color images;

an image read control section having a plurality of read modes;

a carriage for setting an image read position, a buffer memory; and a buffer memory control section, wherein the image read control section includes document attribute sense means for detecting a document attribute according to the data of the respective color images, wherein the document attribute sense means conducts a change-over operation between the plural read modes according to the detected document attribute, wherein the buffer memory temporarily stores therein data obtained through the document read operation, wherein the image read control section discards, when a read mode set at initiation of the document read operation is different from the read mode corresponding to the document attribute detected by the document attribute sense means, the stored data and executes a re-read operation of the document sheet, and wherein the buffer memory control section allows, when the attributes match each other or when the document sheet is read again, the buffer memory to sent the stored video data to an external device.

10. An image reading apparatus according to claim 9, wherein the document attribute sense means further comprises means for sensing at least one additional document attribute, and wherein the document attribute and at least one additional document attribute include color multi-value, color binary, monochrome multi-value, or monochrome binary attributes.

11. An image reading apparatus, comprising:

a document feeding unit for conveying a document sheet bearing an image along a path;

a light source disposed along the path to illuminate the document sheet;

an optical system which receives light reflected along a line of the document sheet and which produces a focused image of the line at a predetermined location with respect to the line, the line being transverse to the document path;

a color image sensor at the predetermined location with respect to the line, the color image sensor producing red, green, and blue video data, and reading means, responsive to the video data, for conducting a read operation in one of a plurality of modes as the document sheet is conveyed along the path, the reading means including means for detecting from the video data whether the image on the document sheet is a monochrome binary images a monochrome multi-value image, a colored binary image, or a colored multi-value image.

12. The image reading apparatus of claim 11, wherein the means for detecting comprises means for generating a histogram from at least some of the video data.

13. The image reading apparatus of claim 12, wherein the means for detecting further comprises means for identifying peaks in the histogram.

14. The image reading apparatus of claim 11, wherein the reading means further comprises means for detecting whether a predetermined event occurs during the reading operation, and for executing a re-read operation in cooperation with the document feeding unit if the predetermined event occurs.

* * * * *